(12) United States Patent
Hirosawa

(10) Patent No.: US 6,335,797 B1
(45) Date of Patent: *Jan. 1, 2002

(54) FACSIMILE CONTROL APPARATUS AND METHOD

(75) Inventor: Takayuki Hirosawa, Ueda (JP)

(73) Assignee: Matsushita Graphic Communication Systems, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,615

(22) Filed: Apr. 23, 1998

(30) Foreign Application Priority Data

May 19, 1997 (JP) .............................................. 9-144700

(51) Int. Cl.[7] .............................. B41B 15/00; H04N 1/00
(52) U.S. Cl. .......................... 358/1.15; 358/401; 399/70
(58) Field of Search .................................. 358/400, 468, 358/442, 404, 444, 401, 406, 434, 437, 474, 498, 497, 1.15; 400/120.01; 355/81, 85, 405; 399/70, 81

(56) References Cited

U.S. PATENT DOCUMENTS

| 4,681,423 A | * 7/1987 | Nishijima ..................... 399/70 |
| 4,745,436 A | * 5/1988 | Matsuura ..................... 399/70 |
| 4,837,813 A | * 6/1989 | Terajima et al. ............ 379/113 |
| 4,963,943 A | * 10/1990 | Tamary ....................... 355/285 |
| 5,219,234 A | * 6/1993 | Sakai .......................... 400/120 |
| 5,282,054 A | * 1/1994 | Oana et al. ................... 358/400 |
| 5,315,350 A | * 5/1994 | Hirobe et al. ................ 355/282 |
| 5,386,272 A | * 1/1995 | Nakazato ..................... 355/207 |
| 5,589,923 A | 12/1996 | Lee et al. ....................... 399/28 |
| 5,673,117 A | * 9/1997 | Ezumi et al. ................ 358/400 |
| 5,694,226 A | * 12/1997 | Yokoyama ................... 358/468 |
| 5,710,637 A | * 1/1998 | Matsumoto .................. 358/474 |
| 5,832,190 A | * 11/1998 | Terajima et al. ............ 358/1.14 |
| 5,854,957 A | * 12/1998 | Morikawa ..................... 399/70 |
| 5,987,274 A | * 11/1999 | Satoh ........................... 399/69 |

FOREIGN PATENT DOCUMENTS

| EP | 0632641 | 1/1995 |
| WO | 95/18356 | 7/1995 |

* cited by examiner

*Primary Examiner*—Kimberly A. Williams
(74) *Attorney, Agent, or Firm*—Greenblum & Bernstein, P.L.C.

(57) ABSTRACT

A prediction section sends a prediction signal to a heater control section when receiving a document setting signal from a sensor for detecting a presence of a document or a book door open signal from a book door open/close sensor. The heater control section turns on power of the heater of a print section. Thereafter, a print control section executes a print operation when a print designation is operated, and turns off power of the heater when no print designation is operated within a fixed period of time or a transmission designation is operated. Therefore, power of the heater is turned on prior to instruction of a print start, and this allows the reduction of time from the operators instruction of the print start to the actual print start.

5 Claims, 5 Drawing Sheets

FACSIMILE CONTROL APPARATUS AND METHOD

BACKGROUND OF THE INVENTION

1. Field of the Invention

The present invention relates to an image processing apparatus such as a facsimile apparatus having a laser beam printer thereon. The present invention also relates to a control method of an image processing apparatus.

2. Description of the Related Art

On the image processing apparatus such as a facsimile apparatus, there is mounted a laser beam printer as a means for copying an original and printing outputs of facsimile receiving data. A heat roller of a thermal fixing section of the laser beam printer is required to be high temperature at a print operation time. Due to this, a heater is provided in the laser beam printer to heat a print section.

Such a heater needs a large amount of electricity for heating. This increases power consumption of the print section. In order to save power, the following measurements are conventionally taken:

More specifically, power of the heater is turned off in a standby state. The heater is turned on only after an operator instructs a print operation. Then, the heat roller is heated by the heater. The printing is started after the heat roller reaches a suitable temperature for printing.

However, it takes several seconds to several minutes for the heat roller to reach the suitable temperature for printing after the heater is turned on. During this time, the operator must stop the operation.

SUMMARY OF THE INVENTION

An object of the present invention is to reduce time from an operator's instruction of a print start to an actual print start in an image forming process.

According to the present invention, there is provided an image processing apparatus, having a print section, for printing an image, comprising:
  a heater provided in the print section;
  a prediction section for detecting a predetermined operation having possibility that a print operation will be performed;
  a heater control section for turning on power of the heater of the print section when the predetermined operation is detected by the prediction section; and
  a print control section for executing a print operation when a print designation is operated after power of the heater is turned on.

Also, according to the present invention, there is provided an image processing, having a print section, for printing an image, comprising:
  a heater provided in the print section;
  a sensor for detecting a state change of the apparatus;
  a key operation section for inputting an operation designation; and
  a control section for turning on power of the heater of the print section when the state change or the operation designation has possibility that a print operation will be performed, and turning off power of the heater of the print section when the state change or the operation designation has no possibility that a print operation will be performed based on both an output of the key operation section and a detection signal of the sensor.

Moreover, according to the present invention, there is provided an image processing apparatus, having a print section and a transmission section, for printing an image and transmitting data from the transmission section, comprising:
  a heater provided in the print section;
  a prediction section for detecting a predetermined operation having possibility that a print operation will be performed;
  a heater control section for turning on power of the heater of the print section when the predetermined operation is detected by the prediction section; and
  a print control section for executing a print operation when a print designation is operated after power of the heater is turned on, and turning off power of the heater after starting a transmission and before ending the transmission when a transmission designation is operated to the transmission section.

Further, according to the present invention, there is provided a control method of an image processing apparatus, having a print section, for printing an image, comprising the steps of:
  detecting a predetermined operation having possibility that a print operation will be performed;
  turning on power of a heater of the print section when the predetermined operation is detected; and
  executing a print operation when a print designation is operated after power of the heater is turned on.

Furthermore, according to the present invention, there is provided a control method of an image processing apparatus, having a print section and a transmission section, for printing an image and transmitting data from the transmission section, comprising the steps of:
  detecting a predetermined operation having possibility that a print operation will be performed;
  turning on power of a heater of the print section when the predetermined operation is detected;
  executing a print operation when a print designation is operated after power of the heater is turned on; and
  turning off power of the heater after starting a transmission and before ending the transmission when a transmission designation is operated to the transmission section.

DETAILED DESCRIPTION OF THE PREFERRED EMBODIMENTS

An embodiment of the present invention will now be specifically explained with reference to the drawings.

Figure 1:
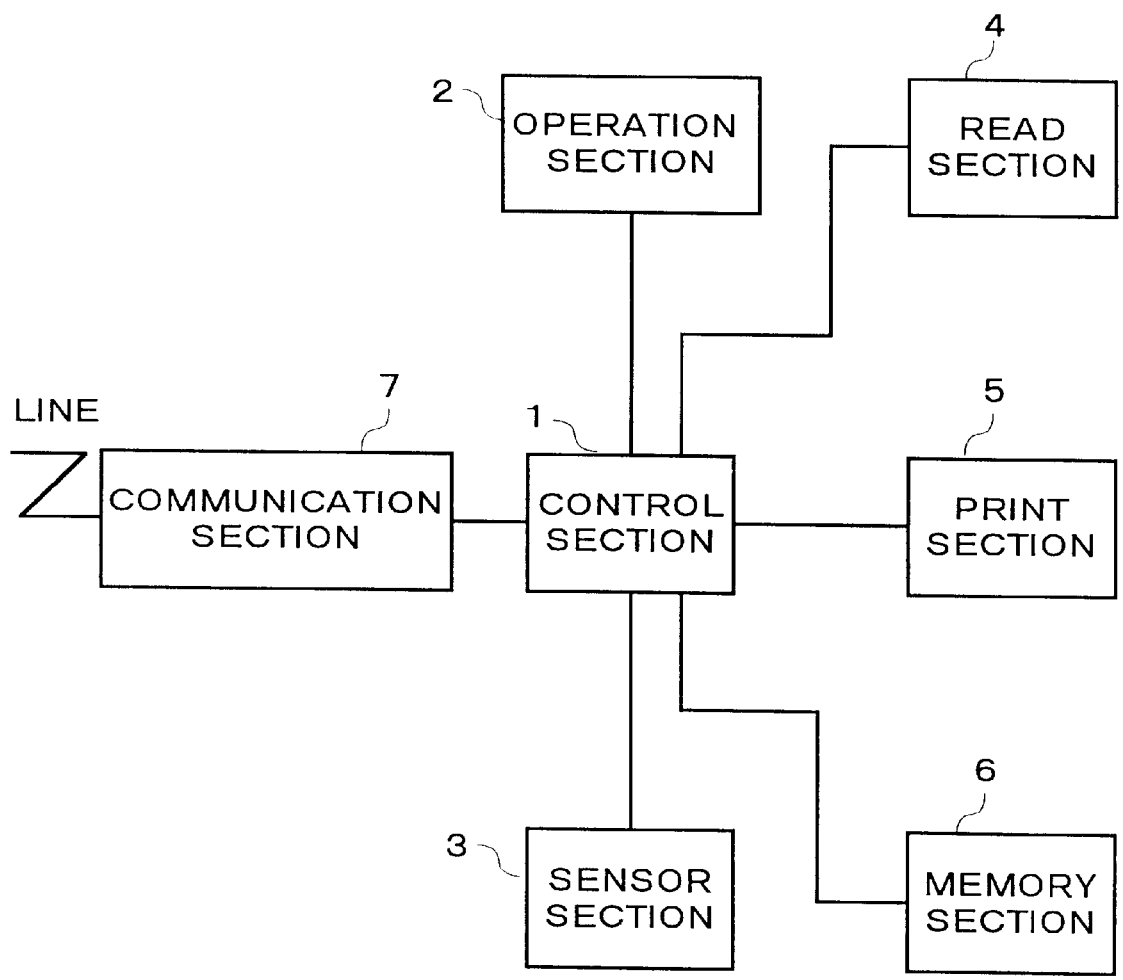
FIG. 1 is a block diagram showing an entire structure of a facsimile apparatus according to one embodiment of the present invention.

Referring first to FIG. 1, an entire structure will be explained. FIG. 1 is a block diagram showing the entire structure of a facsimile apparatus according to the present invention.

In FIG. 1, the facsimile apparatus comprises a control section 1, an operation section 2, a sensor section 3, a read section 4, a print section 5, a memory section 6, and a communication section 7. The control section 1 controls the entire apparatus. The operation section 2 transmits the content of instruction by an operator's key operation to the control section 1. The sensor section 3 detects the change of an apparatus state mechanically. The read section 4 reads an original for transmitting and printing. The print section 5 prints the read data or received data onto paper. The memory section 6 stores the read data and received data. The communication section 7 performs data receiving and transmitting between the facsimile apparatus.

Figure 2:
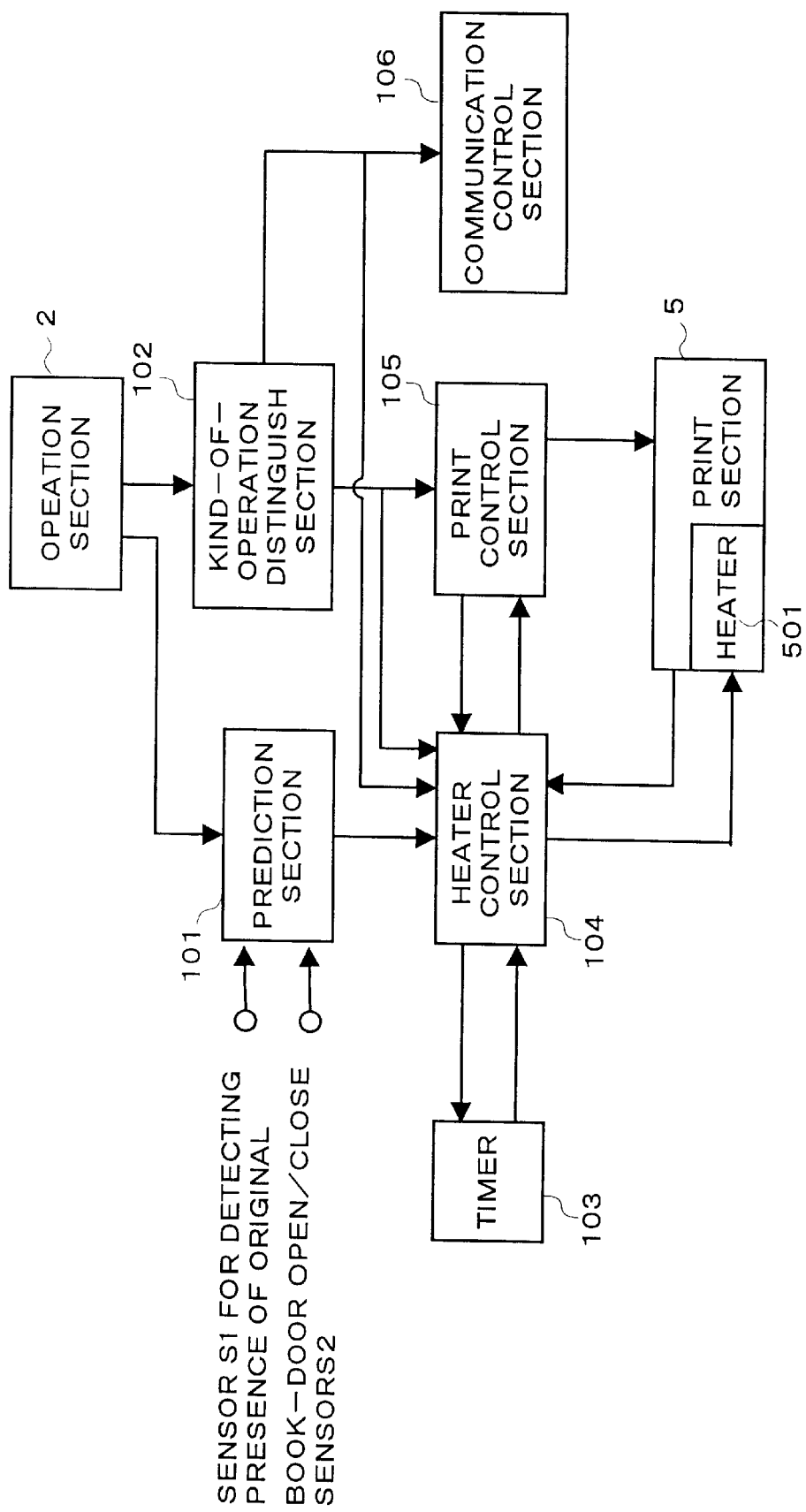
FIG. 2 is a block diagram showing a main part of the facsimile apparatus according to one embodiment of the present invention.

FIG. 2 specifically explains the control section 1 including the relationship with the other parts. FIG.2 is a block diagram showing a main part of the facsimile apparatus according to the embodiment of the present invention.

In FIG. 2, the control section 1 comprises a prediction section 101, a kind-of-operation distinguish section 102, a timer 103, a heater control section 104, a print control section 105, and a communication control section 106. The prediction section 101 predicts whether or not a print operation is performed from input signals of the sensor section 3 and the operation section 2. The kind-of-operation distinguish section 102 distinguishes a kind of operation from the input key of the operation section 2. The timer 103 performs counting. The heater control section 104 performs a power on-off control of a heater 501. The print control section 105 controls the print operation of the print section 5. The communication control section 106 controls data receiving and transmitting between the facsimile apparatus.

The prediction section 101 predicts that a print operation is performed when detecting a predetermined operation having possibility that a print operation will be performed (hereinafter called pre-operation). Then, the prediction section 101 sends a print prediction signal to the heater control section 104. In this embodiment, the following three pre-operations can be considered:

(i) The prediction section 101 receives a document setting signal from a sensor S1 for detecting the presence of the original, which is provided in the sensor section 3.

(ii) The prediction section 101 receives a book door opening signal from a book door open/close sensor S2.

(iii) The prediction section 101 receives a signal designating a print mode from the operation section 2.

In the above detection (iii), an input for designating the print mode means the following command. For example, if the operator depresses a key 6 after a key F6 of the keyboard of the operation section 2, an output report of some kind is output from the print section in accordance with a kind of subsequent key operations.

In the above-explained embodiment, when the above three pre-operations are detected, the prediction section 101 predicts that the print operation is performed. However, the pre-operations include the other operations. For example, a paper supply cassette is opened, the operator stands before the apparatus, etc. Therefore, the other operations can be appropriately added to the above three pre-operations, or replaced with the other pre-operations.

The kind-of-operation distinguish section 102 distinguishes a kind of operation from a signal input from the operation section 2. If the kind of operation is a print designation, the signal is sent to the print control section 105 and the heater control section 104. If the kind of operation is a transmission designation, the signal is sent to the communication control section 106, and the heater control section 104.

When the heater control section 104 receives the print prediction signal from the prediction section 101, power of the heater 501 provided in the print section is turned on, and the timer 103 is started to count at the same time. Thus, power of the heater 501 is turned on prior to the start designation of the print operation. This allows the reduction of time from the operators instruction of the print start to the actual print start.

The heater control section 104 turns off power of the heater 501 when receiving a transmission designation signal from the kind-of-operation distinguish, section 102 after turning on power of the heater 501. The heater control section 104 also turns off power of the heater 501 until a count of the counter reaches a predetermined count number, that is, a case in which no print designation signal is received until the count is up. Therefore, the heater control section 104 turns off the power supply of the heater 501 until a predetermined period of time elapses from the power-on, that is, a case in which no print designation signal is received until time is up.

Thus, such a power-off control of the heater 501 can result in restraint of wasteful power consumption. In the power-off control, the timer may be used. Or, a power-off signal is output from CPU to perform the power-off control directly.

The heater control section 104 checks the temperatures of the heat roller 118 described later, which are heated by the heater 501. Then, when the heater control section 104 checks that they reach a printable temperature, the heater control section 104 sends a printable signal to the print control section 105. When the heater control section 104 receives a print end signal from the print control section 105 after the print operation is ended, the heater control section 104 resets the timer to be restarted.

The print control section 105 receives the print designation signal from the kind-of-operation distinguish section 102. Then, the print control section 105 outputs a print start signal to the print section 5 to start the printing when receiving the printable signal from the heater control section 104. When the printing is ended, the print control section 105 sends the print end signal to the heater control section 104.

The communication control section 106 outputs a transmission start signal to the communication section 7 to start the transmission when receiving a transmission designation signal from the kind-of-operation distinguish section 102.

Figure 3:
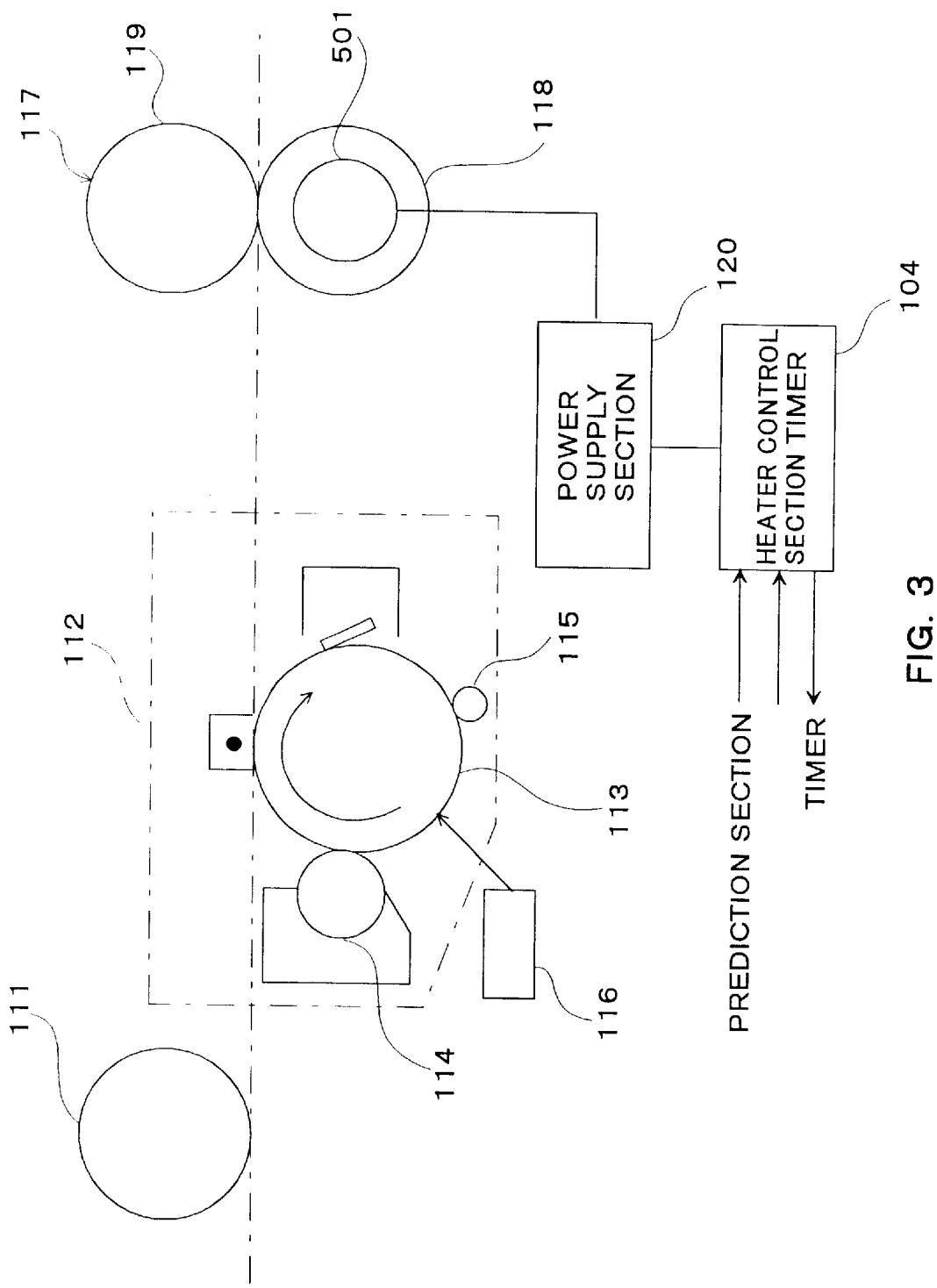
FIG. 3 is a block diagram showing a print section of the facsimile apparatus according to one embodiment of the present invention.

FIG. 3 is a block diagram showing the print section of the facsimile apparatus according to the embodiment of the present invention. In the print section 5, a paper supply roller 111 is provided at an upper stream in a paper carrying direction. A process cartridge 112 for developing is provided at a downstream of the paper supply roller 111. The process cartridge 112 includes a photosensitive drum 113, a toner box 114, and a charger roller 115. A laser unit 116 for emitting a laser beam to the photosensitive drum 113 is also provided. A fixing section 117 is provided at a downstream of the process cartridge unit 112. The fixing section 117 comprises a heat roller 118 with a built-in heater 501, and a pressing roller 119 placed to be opposite to the heat roller 118. The heater 501 is connected to a power supply section 120. The power supply section 120 is structured such that power supply to the heater 501 is turned on/off.

According to the above-mentioned structure, the charger roller 115 charges the photosensitive drum 113. Then, the surface of the photosensitive drum 113 is irradiated with the laser beam emitted from the laser unit 116, so that a latent image is formed. Toner contained in the toner box 114 is adhered to the latent image so as to form a toner image. The toner image is transferred to a print paper. Thereafter, in the fixing section 117, the print paper is pressurized and heated between the heat roller 118 and the pressing roller 119 so as to thermally fix the toner image on the print paper.

Figure 4:
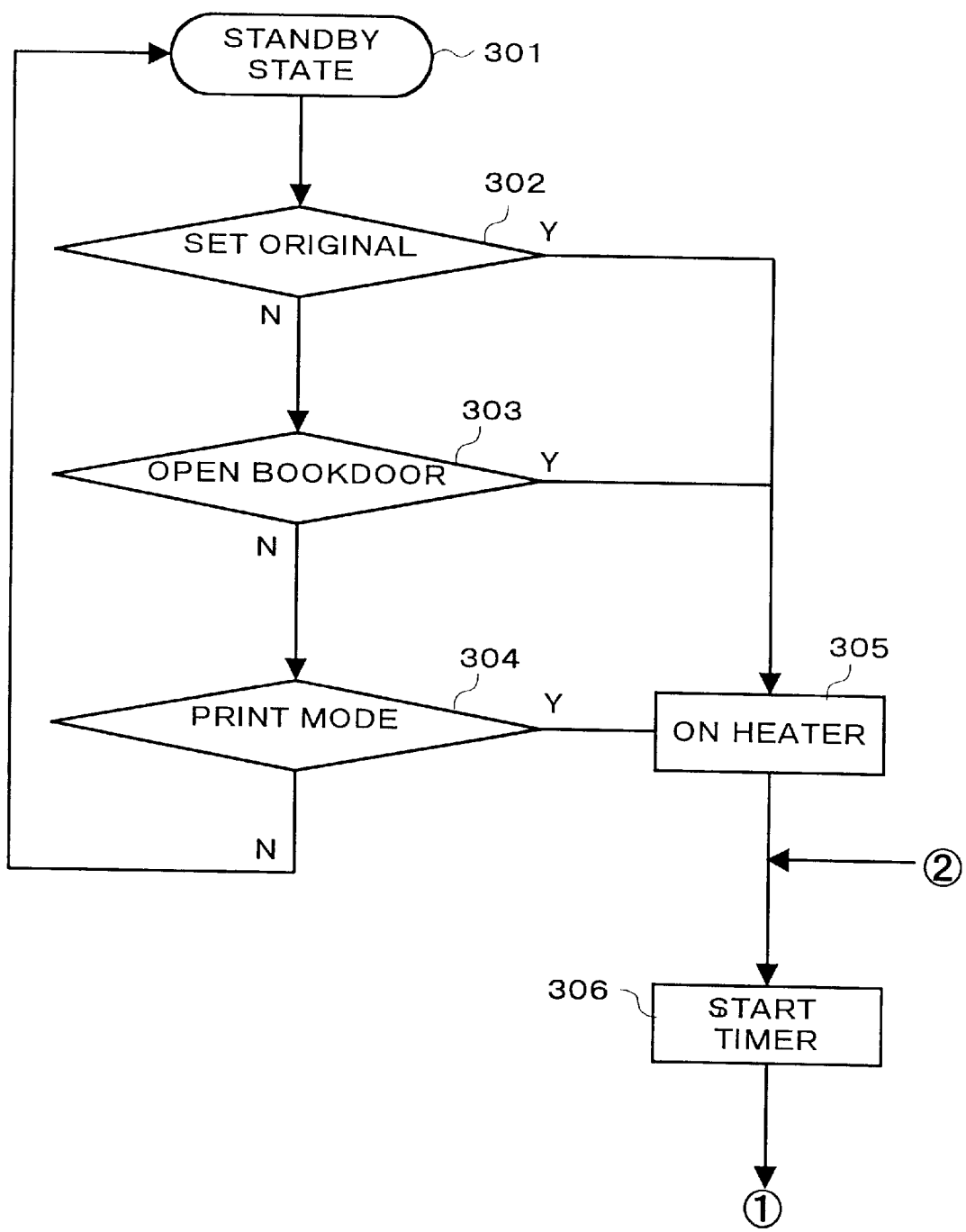
FIGS. 4 and 5 are flowcharts each showing steps from a standby state to a print operation or a transmission operation according to one embodiment of the present invention.
Figure 5:
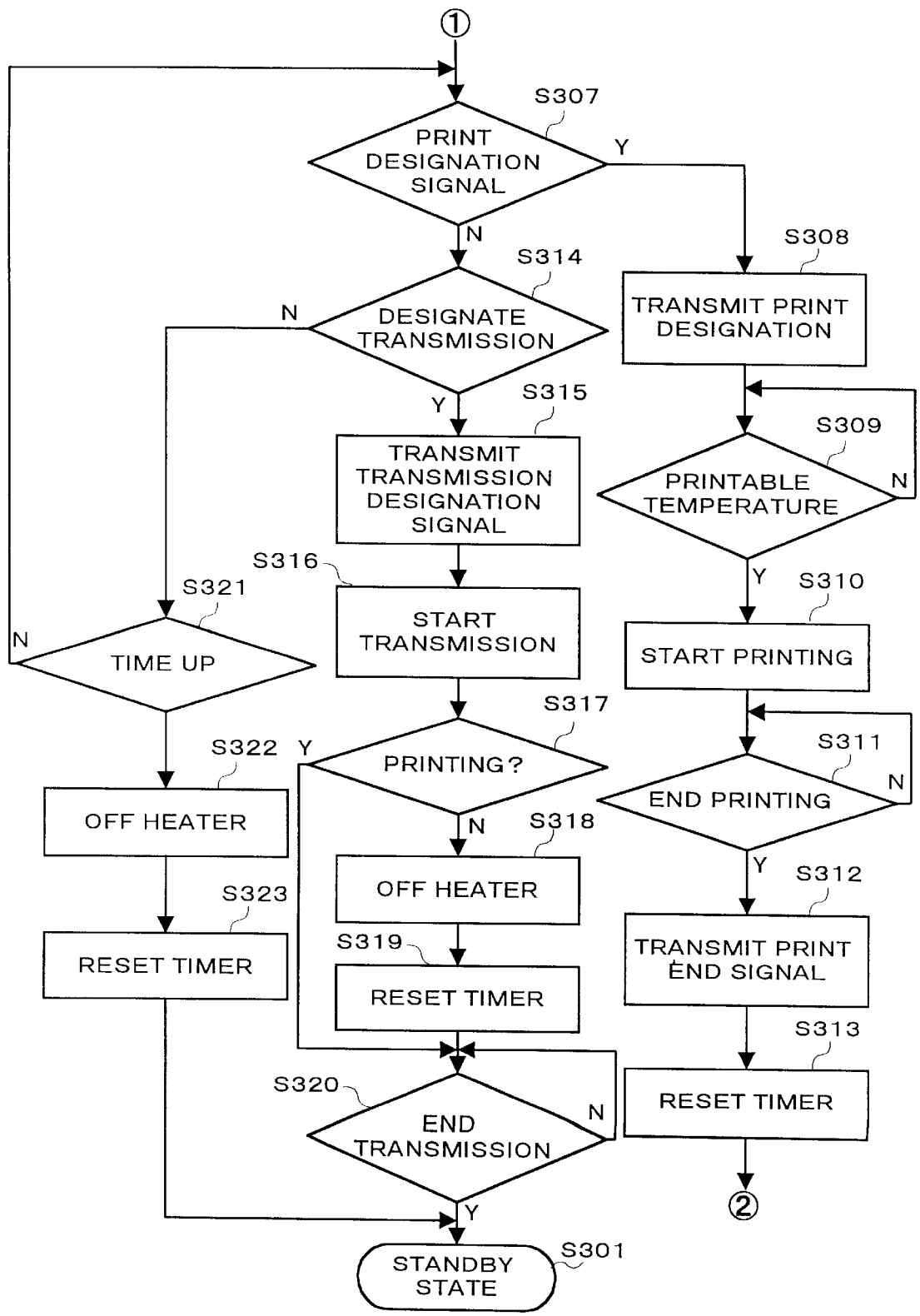

Next, the following will explain the process from the standby state to the printing or transmission with reference to FIGS. 4 and 5. FIGS. 4 and 5 are flowcharts each showing steps from the standby state to the print operation or the transmission operation according to one embodiment of the present invention.

The main body of the facsimile apparatus is normally in a standby state in which power of the heater is turned off even in the main power is turned on and the timer is not operated (S301).

In the standby state, when the operator sets the original on a document plate (not shown), the sensor S1 for the presence of the original detects the set original, and transmits a detection signal to the prediction section 101. The prediction section 101 predicts that the print operation is performed in accordance with the detection signal (S302).

Similarly, if the facsimile apparatus is a book-type and the operator opens a book door, the book-door open/close sensor S2 detects the opened book door, and transmits a detection signal to the prediction section 101. The prediction section 101 predicts that the print operation is performed in accordance with the detection signal (S303).

Similarly, when the operator performs the key inputs of the keyboard of the operation section 2, each signal is transmitted to the prediction section 101. Then, if they are inputs for designating the print mode, the prediction section 101 predicts that the print operation is performed (S304).

When the prediction section 101 predicts that the print operation is performed, the prediction section 101 transmits the signal to the heater control section 104. The heater control section 104 turns on power of the heater 501 in accordance with the prediction signal (S305). The counting operation of the timer 103 is started simultaneously with the power-on of the heater 501 (S306).

The kind-of-operation distinguish section 102 distinguishes whether or not the print designation signal is present from the keyboard of the operation section (S307). If the print designation signal is present, the kind-of-operation distinguish section 102 transmits the signal to the print control section 105 (S308). At the same time, the heater control section 104 checks whether or not the temperatures of the heat roller 118 reach the printable values. If they are printable temperatures, the heater control section 104 transmits the printable signal to the print control section 105 (S309).

The print control section 105 starts to print the print designation signal from the section 102 to the print section when receiving each printable signal from the heater control section 104 (S310).

Next, the print control section 105 checks whether or not the printing is ended (S311). When the printing is ended, the print control section 105 transmits the print end signal to the heater control section 104 (S312). The heater control section 104 resets the timer 103 in accordance with the print end signal (S313), restarts the timer 103 (S306), and waits a next instruction. This allows the operator to start the print operation without waiting after instructing the start of the operation at the second or the subsequent print operations.

In S307, the kind-of-operation distinguish section 102 distinguishes whether or not the transmission designation signal is present when there is no print designation signal (S314). If there is the transmission designation signal is present, the section 102 transmits the signal to the communication control section 106 and the heater control section 104 (S315).

The communication control section 106 starts the transmission by the communication section 7 when receiving the transmission designation signal (S316). Sequentially, the the heater control section 104 checks whether or not the print operation is executing. If the print operation is not executing, the heater control section 104 turns off power of the heater (S318) and resets the timer 103 (S319) when receiving the transmission signal from the section 102. Thus, the heater control section 104 immediately executes the off-control of the heater 501 when checking that the print operation is not designated. As a result, wasteful power consumption can be restrained. On the other hand, if the print operation is executing in S317, the operation goes to S320 to be described later, and the heater is neither turned off nor reset.

Then, the communication control section 106 checks whether or not the transmission is ended (S320). When the transmission is ended, the operation goes back to the standby state (S301).

In S314, if there is no transmission designation signal, the heater control section 104 checks whether or not the count of the timer 103 reaches a predetermined count value, that is, time is up (S321). When the print designation and the transmission designation are not input to the kind-of-operation distinguish section 102 for a fixed period of time, the heater control section 104 turns off the heater (S322). Then, the heater control section 104 resets the timer 103 (S323), and the operation goes back to the standby state (S301). Thus, the power-off control of the heater 501 can restrain the wasteful power consumption.

As explained above, the prediction section 101 can execute the power-on control of the heater 501 in connection with a predetermined operation by the operator. More specifically, the prediction section 101 executes the on-off control of the heater in connection with the predetermined operation based on both detection signals of sensors S1 and S2 and the output of the operation section 2. This allows the reduction of time from the operator s instruction of the print start to the actual print start. Moreover, the wasteful power consumption can be restrained by power-off control of the heater 501.

In the case where the timer 103 is provided and a print designation is operated, the count value of the timer 103 is reset. If no print designation is operated, the heater 501 is turned off since time is up. As a result, the operator can execute the print operation without waiting after instructing the start of the operation at the second or the subsequent print operations. If a transmission designation is operated, the transmission is started and the power of the heater 501 is turned off before ending the transmission. Thereby, the power of the heater is turned on prior to the start designation of the print operation. This allows the reduction of time from the operator s instruction of the print start to the actual print start. By the power-off control of the heater, wasteful power consumption can be restrained. The transmission control, which is designated by the operator, can be executed before power of the heater 501 is turned off.

The embodiment explained the case of the facsimile apparatus. However, the present invention can be applied to an image processing apparatus such as a copy machine other than the facsimile apparatus. Also, the present invention can be applied to a personal computer to which a laser beam printer as a print section is connected.

What is claimed is:

1. A facsimile apparatus that has a print section for printing an image, comprising:
   a document plate that receives a document to be at least one of transmitted and printed;

a read section that reads the document positioned on said document plate;

a transmission section that transmits the document to a designated destination;

a heater provided in said print section, electrical power to said heater being selectively turned ON and OFF;

a detection section that detects a presence of the document on said document plate;

a key operation section that inputs at least one of a transmission instruction and a print instruction;

a heater control section that turns the electrical power to said heater ON when said detection section detects the presence of the document on said document plate, before said print instruction is input; and a print control section that executes a printing operation when said print instruction is input after the electrical power to said heater is turned ON, wherein, when said transmission instruction is input after electrical power to said heater is turned ON, based on a detection of the presence of the document on said document plate, said heater control section turns said electric power to said heater OFF.

2. The facsimile apparatus according to claim 1, wherein said print control section turns power to said heater OFF when a print instruction is not input within a predetermined period of time after power to said heater is turned ON.

3. The facsimile apparatus according to claim 2, further comprising a timer that starts a counting operation after power to said heater is turned ON, that resets a count value when the print instruction is input, and that turns off power to said heater when a print instruction is not input prior to said count value reaching a predetermined value.

4. A facsimile apparatus that has a print section for printing an image, comprising:

a read section that reads a document located on a document plate of said facsimile apparatus;

a transmission section that transmits the document to a designated destination;

a book door that covers the document plate;

a heater provided in said print section, electrical power to said heater being selectively turned ON and OFF;

a detection section that detects one of a presence of the document on said document plate and opening of said book door;

a key operation section that inputs at least one of a transmission instruction and a print instruction;

a heater control section that turns electrical power to said heater ON when said one of the presence of the document on said document plate and opening of said book door is detected by said detection section, before a print instruction of said print section is input; and a print control section that performs a printing operation when said print instruction is input, after electrical power to said heater is turned ON, wherein, when said transmission instruction is input after electrical power to said heater is turned ON, based on a detection of one of the presence of the document on said document plate and the opening of said book door, said heater control section turns electric power to said heater OFF.

5. A control method for a facsimile apparatus that has a print section for printing an image, comprising:

detecting one of a presence of a document on a document plate of the facsimile apparatus and opening of a book door of the facsimile apparatus;

turning electrical power to a heater of the print section ON when the one of presence of the document on the document plate and opening of the book door is detected, before a print operation of the print section is instructed;

executing the print operation when the printing operation is instructed after the electrical power to the heater is turned ON;

transmitting the document to a designated destination when a transmission instruction is input; and turning electric power to the heater OFF when the transmission instruction is input after the electrical power to the heater is turned ON, based on the detecting of one of the presence of the document on the document plate and the opening of the book door.

* * * * *